United States Patent [19]

Kraft

[11] 4,355,991
[45] Oct. 26, 1982

[54] ARRANGEMENT FOR TENSIONING THE DRIVE BELT FOR VEHICLE ACCESSORIES

[75] Inventor: Derald H. Kraft, Canton, Ohio

[73] Assignee: Dyneer Corporation, Canton, Ohio

[21] Appl. No.: 63,193

[22] Filed: Aug. 3, 1979

[51] Int. Cl.³ .............................................. F16H 7/14
[52] U.S. Cl. .................................................. 474/110
[58] Field of Search .............. 74/242.14 R, 242.15 R, 74/242.1 FP, 242.1 R, 242.1 A; 474/110

[56] References Cited

U.S. PATENT DOCUMENTS

| | | | |
|---|---|---|---|
| 1,852,768 | 4/1932 | Carden | 74/242.15 R |
| 2,051,488 | 8/1936 | Kottlowski et al. | 74/242.1 FP |
| 2,456,088 | 12/1948 | Scircle | 74/242.15 R |
| 2,703,019 | 3/1955 | Burawoy | 74/242.11 A |
| 2,893,255 | 7/1959 | Bayliss | 74/242.8 |
| 3,132,596 | 5/1964 | Dinger | 74/242.15 R X |
| 3,142,193 | 7/1964 | Polko et al. | 74/242.11 R |
| 3,413,866 | 12/1968 | Ford | 74/242.11 R |
| 3,483,763 | 12/1969 | Enters | 74/242.15 R |
| 3,631,734 | 1/1972 | Wagner | 74/242.15 R |
| 3,768,324 | 10/1973 | Vanderstegen-Drake | 74/242.15 R |
| 3,812,733 | 5/1974 | Yoshida | 74/242.11 S |
| 3,924,483 | 12/1975 | Walker et al. | 74/242.11 R |
| 3,965,768 | 6/1976 | Foster | 74/242.15 R |
| 3,975,965 | 8/1976 | Speer | 74/242.15 R |
| 4,077,272 | 3/1978 | Busso | 74/242.1 FP |
| 4,144,772 | 3/1979 | Brackin et al. | 74/242.15 R |

Primary Examiner—C. J. Husar
Assistant Examiner—Conrad Berman
Attorney, Agent, or Firm—Frease & Bishop

[57] ABSTRACT

A hydraulic tensioning arrangement for an endless drive belt for a vehicle accessories drive system. The vehicle alternator is pivotally mounted on the engine and is driven by a pulley which is drivingly engaged with the drive belt. A hydraulically actuated piston is mounted in a generally fixed position on the engine closely adjacent to the alternator and is operatively connected to the alternator for pivotally moving it to a belt tensioning position. Hydraulic fluid is supplied to the piston cylinder from the vehicle's power steering fluid supply. A ratchet bar is mounted on the piston cylinder and is slidably engaged in a guide bracket mounted on the alternator. A spring-biased pawl is mounted on the guide bracket and is engageable with a series of teeth formed on the extended end of the ratchet bar. The pawl-teeth engagement prevents movement of the alternator away from the belt tensioning position during a decrease in hydraulic fluid or pressure in the piston cylinder to mechanically maintain a constant predetermined belt tensioning force on the belt at all times without the use of springs.

7 Claims, 6 Drawing Figures

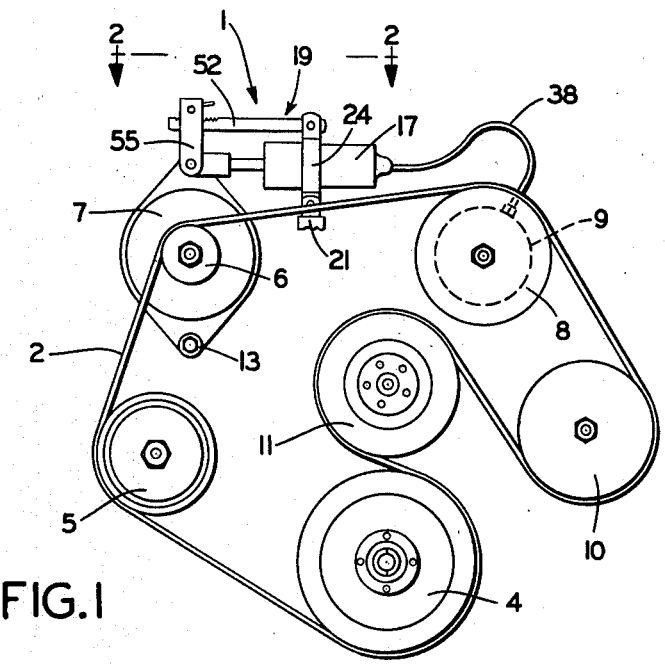
FIG.1
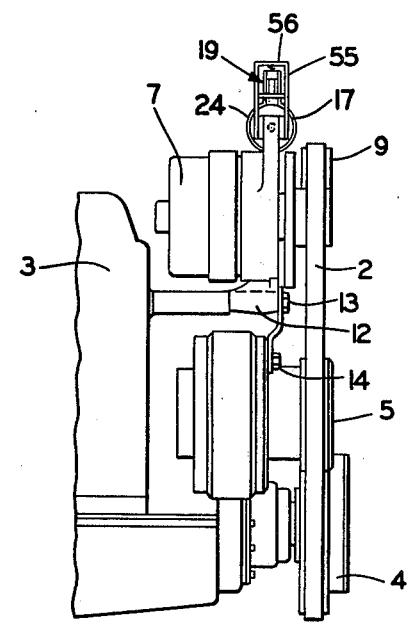
FIG.6
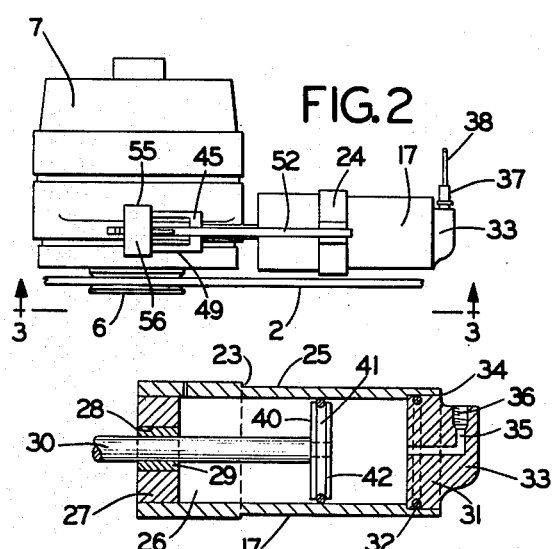
FIG.2
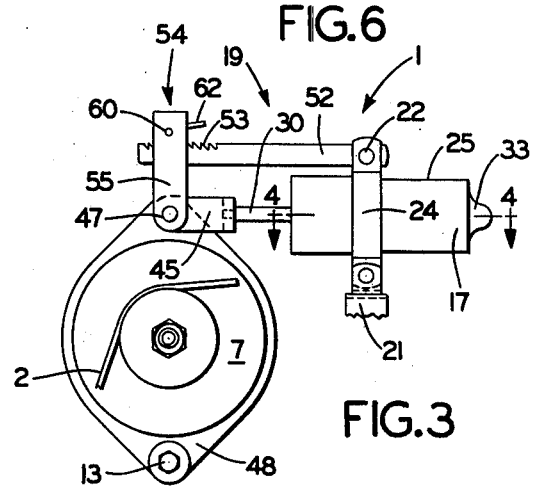
FIG.3
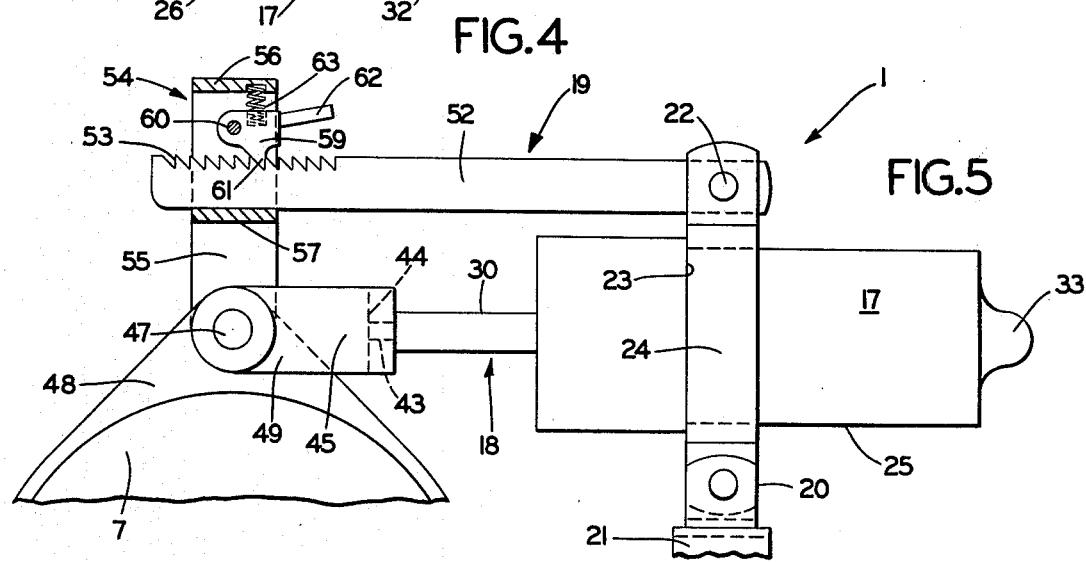
FIG.4
FIG.5

ARRANGEMENT FOR TENSIONING THE DRIVE BELT FOR VEHICLE ACCESSORIES

BACKGROUND OF THE INVENTION

1. Field of the Invention

The invention relates to belt tensioning devices and arrangements, and in particular to hydraulically actuated belt tensioners and the arrangements thereof for use with an endless belt of the vehicle accessories drive system. More particularly, the invention relates to an improved arrangement for tensioning such a drive belt in which one of the vehicle accessories is movably mounted to tension the belt which is drivingly engaged therewith by a hydraulic actuated piston, in combination with a ratchet-pawl mechanism which limits movement of said one accessory in the opposite nontensioning direction.

2. Description of the Prior Art

There is the trend today in the automobile industry to operate the various vehicle accessories, such as the power steering pump, oil and air pumps, air conditioning and alternator, by a single endless belt driven by a pulley connected to the engine crankshaft. This system is referred to as a "serpentine" drive belt system. To insure optimum operating efficiency for these various accessories, it is necessary that the drive belt be maintained at a predetermined tension to assure efficiency performance of the accessories, as well as satisfactory service life for the belt. Due to the relatively greater length of the single drive belt which replaces the heretofore plurality of smaller belts, there is a greater tendency for the belt to stretch, which will affect the operating characteristics of the driven accessories. Therefore, it is desirable that a belt tensioning device and arrangement be used for these endless belts to provide reliable service over an extended period of time and to maintain a constant amount of tension thereon regardless of the amount of belt stretch.

Numerous devices and belt tensioning arrangements have been proposed and used to accomplish this purpose. One type of tensioning arrangement uses a tensioner having a bushing formed of an elastomeric material which is placed in compression by some mechanical means for continuously exerting a tensioning force on the belt. Examples of these constructions and arrangements are shown in U.S. Pat. Nos. 3,975,965 and 4,144,772. These tensioner constructions, which use an elastomeric material, have the disadvantages in that the high load rate which they exert on the belt results in the rapid loss of tensioning as the belt stretches, and this load rate limits the stroke of the belt-engaged idler pulley to a shorter distance than desired. Also, sudden acceleration and deceleration of the drive belt can cause a whipping action to occur which creates a time lag before full damping is achieved.

Numerous other types of belt tensioning devices and arrangements use springs for applying and maintaining the tensioning force on a belt-engaging idler pulley or chain-engaging sprocket. Some examples of these types of constructions and arrangements are shown in U.S. Pat. Nos. 2,703,019, 2,893,255, 3,483,763 and 3,965,768. Some of these various spring-actuated devices use the biasing force of the spring in combination with hydraulic-actuated members for regulating the amount of tensioning force applied to the belt, depending on whether the engine is running or shut off.

U.S. Pat. No. 2,051,488 shows a chain tensioning arrangement in which a hydraulic cylinder is actuated when the engine is running to reduce the tensioning pressure which is exerted on the drive chain by a biasing spring. This hydraulic cylinder applies a counter force to the biasing action of the spring when the engine is running in order to decrease the tensioning force on the chain, whereupon the full biasing force of the spring is exerted on the chain when the engine is off and the hydraulic cylinder inactive. U.S. Pat. No. 3,142,193 discloses another belt tensioning arrangement using a hydraulically actuated bellcrank and belt-engaging pulley in which a spring biases the pulley into tensioning engagement with the belt until the engine is operating, whereupon the hydraulic-actuated piston imparts a greater tensioning force to the pulley through the bellcrank. When the engine stops, the piston retracts and the spring maintains a lesser tensioning force on the belt. U.S. Pat. No. 4,077,272 discloses another belt tensioning arrangement using both a spring and a hydraulic member to achieve the desired tensioning characteristics. In this arrangement, when the engine is running, hydraulic oil from the engine lubricating system forces a piston back into its cylinder to overcome an internally mounted first spring so that only a second spring acts on the belt tensioning pulley when the engine is operating. When the engine is off, both springs act on the belt tensioning pulley. U.S. Pat. No. 3,132,596 shows a belt tensioner using a hydrostatic snubber controlled by the power steering pump of the vehicle, whereupon the snubber is forced outwardly in direct relationship to the output pressure of the power steering pump. This mechanism does not maintain a constant pressure on the belt when the vehicle engine is both on and off, and will apply different forces in relationship to the engine speed.

Other types of tensioning devices and arrangements are provided with some type of mechanical retaining means, usually a ratchet retaining mechanism, which limits the movement of the belt tensioning member in an opposite nontensioning direction, thereby maintaining a constant tensioning force on the endless drive belt. Most of these known arrangements use a spring-biased member in combination with the retaining means for achieving the belt tensioning effect. Examples of these prior constructions and arrangements are shown in U.S. Pat. Nos. 2,051,488, 2,703,019, 3,631,734 and 3,812,733. Another known tensioning arrangement having mechanical detent-ratchet retaining means uses the weight of the vehicle accessory to achieve the tensioning force on the drive belt, and is shown in U.S. Pat. No. 3,413,866.

Other known types of belt tensioners and tensioning arrangements will pivot one of the vehicle accessories toward belt tensioning engagement either by springs, as shown in U.S. Pat. Nos. 3,768,324 and 3,924,483, or by a hydraulic snubber, as shown in U.S. Pat. No. 3,132,596. However, none of these constructions use a mechanical ratchet-pawl retaining means to limit the movement of the tensioning device in an opposite nontensioning direction except the arrangement of U.S. Pat. No. 3,413,866, which relies entirely on the weight of the pivotally mounted accessory, as discussed above, for achieving the desired tensioning force on the belt.

Many of these prior devices are believed to perform satisfactorily for their intended purpose, but it is preferred that the use of springs for effecting the tensioning force on a drive belt or chain, either for applying or retracting a tensioning member therefrom, presents problems. The operating characteristics of these springs will change over the life of the spring and even in response to changes in ambient temperature. Also, as the drive belt stretches, the spring's biasing effect changes, making it difficult to maintain a constant tensioning force on the drive belt. Likewise, the springs may become rusted and corroded and break during the life of the vehicle, presenting mechanical maintenance problems for the vehicle owner.

Relying on the weight of the vehicle accessory for applying the tensioning force on the belt, will not provide a constant tensioning force thereon since the amount of tensioning force will increase as the vehicle accessory moves further past its center balanced position. Likewise, the amount of tensioning force is controlled entirely by the initial weight of the accessory and its position past center, which may not provide a sufficiently large tensioning force, as desired.

Accordingly, it is desirable to provide a belt tensioning arrangement for a vehicle accessory drive belt which eliminates the use of springs for achieving, controlling and maintaining the tensioning force on the belt, which arrangement will maintain a constant predetermined tension on the belt throughout the life of the belt regardless of whether the engine is on or off or being driven at high or low speeds.

There is no known belt tensioning arrangement of which I am aware which imparts and maintains a constant predetermined tensioning force on the drive belt for the vehicle accessories by pivotally moving one of the accessories which is driven by the belt, toward a tensioning direction by a hydraulically actuated piston, in combination with a mechanical mechanism to prevent movement of the accessory in an opposite direction without the use of any springs or similar biasing means, and which maintains this constant pressure on the belt whether the engine is on or off or operating at various speeds.

SUMMARY OF THE INVENTION

Objectives of the invention include providing an improved arrangement for tensioning the drive belt for vehicle accessories which maintains a constant predetermined tensioning force on the drive belt throughout the life of the belt and regardless of whether the engine is on or off or operating at various speeds and conditions; providing such a belt tensioning arrangement in which a hydraulically actuated piston pivotally moves one of the vehicle accessories, preferably the alternator, to tension the drive belt which is operatively drivingly engaged therewith, in combination with a mechanical spring-biased ratchet-pawl mechanism to limit or prevent movement of the vehicle accessory in the opposite direction; providing such an improved belt tensioning arrangement which is relatively unaffected by rapid engine acceleration and deceleration and changes in engine operating speeds; providing such an improved belt tensioning arrangement which completely eliminates the use of springs for imparting the belt tensioning force, which springs are subject to breakage and changing operating characteristics; and providing such an improved drive belt tensioning arrangement which is of a relatively simple construction, which reduces maintenance and repair problems, which achieves the stated objective in a simple, effective and relatively inexpensive manner, and which solves problems and satisfies needs in the art.

These objectives and advantages are obtained by the improved arrangement for tensioning an endless drive belt for vehicle engine accessories, the general nature of which may be stated as including a vehicle accessory pivotally mounted with respect to the vehicle engine and operatively engaged with and driven by the endless drive belt; piston means operatively engaged with said vehicle accessory for pivotally moving the accessory to a tensioning position for applying a predetermined tensioning force on the drive belt engaged therewith; fluid supply means communicating with the piston means for hydraulically actuating said piston means to pivot the said vehicle accessory to the belt tensioning position; and ratchet means operatively engageable with the said accessory to maintain said accessory in the belt tensioning position to maintain the predetermined tensioning force on the belt during a decrease in hydraulic fluid pressure.

BRIEF DESCRIPTION OF THE DRAWING

A preferred embodiment of the invention, illustrative of the best mode in which applicant has contemplated applying the principles, is set forth in the following description and shown in the accompanying drawing, and is particularly and distinctly pointed out and set forth in the appended claims.

FIG. 1 is a diagrammatic view looking toward the front of an engine, illustrating an endless drive belt operatively connected to and driving the vehicle accessories, having the improved belt tensioning arrangement incorporated therein;

FIG. 2 is an enlarged fragmentary top plan view of the pivotally mounted vehicle accessory and piston means looking in the direction of arrows 2—2, FIG. 1;

FIG. 3 is a fragmentary front elevational view looking in the direction of arrows 3—3, FIG. 2;

FIG. 4 is an enlarged fragmentary sectional view taken on line 4—4, FIG. 3;

FIG. 5 is an enlarged fragmentary front elevational view of the upper portion of the arrangement shown in FIG. 3, with portions shown in section; and FIG. 6 is a left-hand end view of the drive belt arrangement shown in FIG. 1, with portions of the engine shown therein.

Similar numerals refer to similar parts throughout the drawing.

DESCRIPTION OF THE PREFERRED EMBODIMENT

Referring to FIG. 1 of the drawing, the improved belt tensioning arrangement is shown diagrammatically in cooperation with a vehicle accessories drive system. An improved hydraulic belt tensioner construction used in the tensioning arrangement is indicated generally at 1, and is shown in tensioning engagement with an endless drive belt 2 of the power transmission belt drive system. The drive system consists of a plurality of belt pulleys or sheaves having configurations and diameters determined by and associated with engine accessory components and their locations relative to each other. The various pulleys are supported on their respective engine components which, in turn, are mounted on an engine 3 (FIG. 6) in a usual manner known in the art. Belt 2 operates in a single vertical plane, as shown in FIG. 6, to eliminate binding and skewing of the belt.

The engine accessories drive system consists of a main driving pulley 4 which is operatively connected to the main drive shaft of the engine, a pulley 5 which is operatively connected to the air conditioning motor, a pulley 6 which is operatively connected to an alternator 7 which provides the electrical power for the engine, a pulley 8 which is operatively connected to the vehicle's power steering unit 9, a pulley 10 which is operatively connected to the engine air pump, and a pulley 11 which is operatively connected to the engine water pump. Alternator 7 is pivotally mounted on a bracket 12 by a bolt 13, with bracket 12 being mounted on engine 3 by mounting bolts 14. This mounting arrangement for alternator 7 enables the hydraulic belt tensioner 1 to pivotally move alternator 7 about pivot bolt 13 in a counterclockwise direction (FIG. 1) for tensioning belt 2 through its driving engagement with pulley 6.

Belt tensioner 1 includes as main components a hydraulic cylinder 17, a piston 18, and a ratchet-pawl mechanism 19. Cylinder 17 is pivotally mounted by a pin 20 on a bracket 21 (only a portion of which is shown), which is mounted on a fixed position on engine 3. Another bracket 24 extends about cylinder 17 and is held in clamping engagement therewith by bottom pivot pin 20 and a top pin 22. Bracket 24 is in abutting engagement with an annular shoulder 23 formed on the outer cylindrical wall 25 which forms cylinder 17 (FIGS. 4 and 5). Bracket 24, in turn, is pivotally mounted on a mounting bracket 21.

Cylindrical wall 25 of cylinder 17 forms a hollow cylindrical-shaped interior chamber 26. The front open end of chamber 26 is closed by a disc-shaped end wall 27 having a central opening 28 formed therein in which a bushing 29 is mounted for slidably receiving and supporting a piston rod 30. The opposite open end of cylinder chamber 26 is closed by an end cap 31 having a sealing O-ring 32 and an outer coupling boss 33. End cap 31 may be secured in the open end of cylinder 17 by peening or deforming adjacent metal areas of the end cap and cylinder wall, indicated at 34, at spaced circumferential locations about the closure. An inlet passage 35 is formed through boss 33 and communicates with cylinder chamber 26. The outer end of passage 35 terminates in an internally threaded portion 36 for receiving a threaded coupler 37 of a flexible conduit 38 (FIG. 2). The opposite end of conduit 38 is attached to power steering unit 9 for supplying a relatively high-pressure hydraulic fluid to chamber 26 of cylinder 17.

Piston 18 includes a cylindrical rod 30 and a piston head 40 (FIG. 4) mounted on one end thereof. A sealing ring 41 is mounted in an annular recess 42 of piston head 40 to provide a sliding sealing engagement with the internal cylindrical surface of cylinder wall 25. The outer end of rod 30 (FIG. 5) has a reduced threaded portion 43 which is engaged in a complementary threaded opening formed in the web wall 44 of a U-shaped clevis 45. Clevis 45 is pivotally mounted by a pin 47 to the top movable portion of alternator 7. Pin 47 extends through an opening formed in alternator flange 48 and through aligned openings formed in the spaced legs 49 of clevis 45.

In accordance with one of the features of the invention, ratchet-pawl mechanism 19 is mounted on and is operatively engageable with cylinder 17 and alternator 7 for providing a positive mechanical action which limits movement of the alternator away from its belt-tensioning position upon a change or loss of hydraulic pressure in cylinder 17. Mechanism 19 includes a ratchet bar 52 which is pivotally mounted on the top of cylinder mounting bracket 24 by pin 22. The extended end of bar 52 is formed with a series of angled teeth 53.

An inverted generally U-shaped bracket 54 is pivotally mounted on the top of alternator flange 48 by pin 47. Pin 47 extends through openings formed in the bottom of a pair of spaced, vertically extending bracket legs 55. Top and intermediate cross members 56 and 57 (FIG. 5) extend between legs 55. Intermediate cross member 57 provides a guide support for the extended end of ratchet bar 52.

A pawl 59 is pivotally mounted on bracket 54 between bracket legs 55 by a pin 60 which extends therebetween and is located between cross members 56 and 57. Pawl 59 includes a ratchet teeth-engaging projection 61 and a release lever 62. A coil spring 63 extends between top cross member 56 and pawl 59, biasing pawl 59 toward engaged position wherein projection 61 engages one of the ratchet bar teeth 53.

The operation of the improved vehicle accessory drive belt tensioning arrangement is set forth below. Cylinder 17 is connected by conduit 38 to a source of hydraulic fluid, preferably to the power steering drive unit 9 which provides a relatively high hydraulic pressure for actuation of piston 18. This source of hydraulic fluid and pressure is preferably over the relatively lower pressure available from the engine lubricating system which would necessitate some type of a fluid pump or special hydraulic cylinder construction, such as shown in my copending application, Ser. No. 060,903, filed July 29, 1979, to achieve sufficient pressure for actuation of piston 18.

Upon installation of belt 2, alternator 7 will be manually rotated in a counterclockwise direction about bolt 13 to place sufficient tension on belt 2 for operation of the vehicle accessories upon engine start-up. Immediately upon engine start-up, hydraulic fluid and its corresponding pressure is supplied to chamber 26 and applied to piston head 40, slidably moving piston rod 30 outwardly from cylinder 17 rotating alternator 7 in a counterclockwise direction to tension belt 2.

The size of cylinder 17 and piston head 40 are determined in relationship to the known amount of hydraulic pressure to be supplied thereto from power steering unit 9, so that the desired amount of belt tensioning force exerted by piston 18 can be achieved. Accordingly, this predetermined amount of tension will be exerted on piston 18 upon a certain engine operating condition being reached. Bracket 54 of the ratchet-pawl mechanism 19 moves with the top of alternator 7 as piston 18 moves outwardly under the influence of the hydraulic pressure, with pawl projection 61 sliding easily over and along ratchet bar teeth 53 due to the particular slope of the teeth. Pawl projection 61 prevents return movement of alternator 7 in a clockwise direction upon a decrease or loss of hydraulic pressure in cylinder 17, thereby maintaining alternator 7 in its furthermost belt tensioning position.

As belt 2 stretches, the predetermined hydraulic force exerted on piston 18 will pivot alternator 7 farther in a counterclockwise direction to maintain the constant tensioning force on belt 2. Pawl projection 61 again permits clevis 45 and pawl mounting bracket 54 to move in a counterclockwise direction along ratchet bar teeth 53. Projection 61 will permit these components and alternator 7 to move in a clockwise direction a distance no greater than the pitch between adjacent teeth 53. Thus, the predetermined tensioning force for which hydraulic belt tensioner 1 was designed and constructed will always be maintained on belt 2 regardless of the engine operating condition, speed of the vehicle, etc., due to alternator 7 being prevented from movement in the nontensioning direction.

The improved belt tensioner and its arrangement enable maintenance to be performed easily on any of the vehicle accessories or on drive belt 2 by manual upward movement of pawl release lever 62 which disengages projection 61 from teeth 53. This enables alternator 7 to be pivoted in a clockwise direction until belt 2 has sufficient slack for its removal from one or all of the accessories. No hydraulic pressure will be acting on piston 18 since this work will be performed when the engine is off, whereupon no pressure is supplied through conduit 38 to cylinder 17.

The improved hydraulic belt tensioner 1 and its arrangement have a number of advantageous features. This arrangement prevents backing off or slackening of belt 2 in the event of even partial hydraulic pressure or fluid loss and during engine shutdown due to the mechanical locking feature of ratchet-pawl mechanism 19. Alternator 7 preferably will operate throughout a range closely adjacent to the vertical positioning of alternator 7, i.e., alternator 7 is shown in a generally vertical position in FIG. 1, and throughout the belt life will move throughout an angle of approximately 20°, or 10° on each side of vertical. Thus, this limited angular movement of alternator 7 about the horizontal axis of bolt 13 does not rely on nor is it affected by the weight of the alternator for tensioning of the belt, as in some prior art tensioning arrangements. Likewise, due to this limited angular movement about the vertical, piston rod 30 will move generally in a horizontal direction parallel with ratchet bar 52, eliminating binding of the various ratchet and piston components throughout the entire angular movement of alternator 7.

Another advantage of the improved arrangement and belt tensioner construction 1 is the relatively simple and inexpensive construction of cylinder 17 and its piston 18, including the ratchet-pawl mechanism 19. These various components are of an extremely simple and inexpensive design, easily manufactured in mass quantities, and can be mounted on the engine by a single bracket 21. Also, the use of check valves and other hydraulic control means as in prior constructions have been eliminated, thereby reducing the cost of the piston for use by those car manufacturers and suppliers desiring such a type of tensioner construction. Furthermore, this improved arrangement eliminates the use of an idler pulley and its mounting bracket since one of the vehicle accessories is used for the tensioning function, thereby eliminating additional components.

Accordingly, the improved belt tensioner construction and its arrangement for tensioning the drive belt for the vehicle accessories is simplified, provides an effective, safe, inexpensive and efficient means which achieves all of the enumerated objectives, provides for eliminating difficulties encountered with prior tensioning devices and arrangements, and solves problems and obtains new results in the art.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved belt tensioning means is constructed, assembled and operated, the characteristics of the new construction and arrangement, and the advantageous, new and useful results obtained; the new and useful structures, devices, elements, arrangements, parts, and combinations are set forth in the appended claims.

I claim:

1. An arrangement for tensioning an endless drive belt of a vehicle engine accessories drive system including:
    (a) a vehicle accessory pivotally mounted with respect to the vehicle engine and operatively engaged with and driven by the endless drive belt;
    (b) piston means operatively engaged with the said vehicle accessory for pivotally moving said accessory to a tensioning position and for applying a predetermined tensioning force on the drive belt engaged therewith;
    (c) fluid supply means communicating with the piston means for hydraulically actuating said piston means to pivot the vehicle accessory to the belt tensioning position and to apply the predetermined tensioning force on the drive belt; and
    (d) ratchet-pawl means operatively engageable with the said accessory, said ratchet-pawl means including:
        (i) a ratchet bar having a series of teeth formed thereon,
        (ii) a pivotally mounted pawl having a projection which operatively engages individual teeth of the ratchet bar, and
        (iii) a spring biasing the pawl projection toward engagement with the ratchet bar teeth to maintain the accessory in the belt tensioning position and to maintain the predetermined tensioning force on the belt during a decrease in hydraulic pressure on the piston means.

2. The arrangement defined in claim 1 in which the said pivotally mounted vehicle accessory is an alternator having a pulley drivingly connected to said alternator; and in which the endless drive belt is operatively mounted on and engaged with said alternator pulley.

3. The arrangement defined in claim 1 in which the fluid supply means is the hydraulic fluid of the vehicle power steering accessory.

4. The arrangement defined in claim 1 in which the said vehicle accessory is pivotally movable about a horizontal axis throughout an arc of approximately 20°.

5. The arrangement defined in claim 1 in which the pawl has a lever for manually releasing the pawl projection from engagement with the ratchet bar teeth.

6. An arrangement for tensioning an endless drive belt of a vehicle engine accessories drive system including:
    (a) a vehicle accessory pivotally mounted with respect to the vehicle engine and operatively engaged with and driven by the endless drive belt;
    (b) piston means operatively engaged with said vehicle accessory for pivotally moving said accessory to a tensioning position and for applying a predetermined tensioning force on the drive belt engaged therewith, said piston means including a cylinder formed with a hydraulic fluid-receiving chamber and a piston rod slidably mounted in said chamber and movable outwardly therefrom by a hydraulic fluid, and bracket means pivotally mounting the cylinder with respect to the vehicle engine, said piston rod being operatively engaged with said vehicle accessory for pivotally moving said accessory to tension the drive belt upon outward movement of the piston rod;

(c) fluid supply means communicating with the piston means for hydraulically actuating said piston means to pivot the vehicle accessory to the belt tensioning position and to apply the predetermined tensioning force on the drive belt; and (d) ratchet-pawl means operatively engageable with said accessory to maintain said accessory in the belt tensioning position and to maintain the predetermined tensioning force on the belt during a decrease in hydraulic pressure on the piston means, said ratchet-pawl means including a ratchet bar mounted on the piston means cylinder and extending generally parallel with the piston rod and a spring-biased pawl mounted on the said vehicle accessory and operatively engageable with the ratchet bar to prevent movement of the vehicle accessory in a non-belt-tensioning direction upon decrease in hydraulic fluid pressure.

7. The arrangement defined in claim 6 in which a guide bracket is pivotally mounted on the said vehicle accessory; and in which the spring-biased pawl is mounted on the guide bracket and engages the ratchet bar which extends through said guide bracket.

* * * * *